United States Patent
Aoki et al.

(10) Patent No.: US 6,883,626 B2
(45) Date of Patent: Apr. 26, 2005

(54) HYBRID VEHICLE AND CONTROL METHOD THEREOF

(75) Inventors: Kazuo Aoki, Anjo (JP); Kazuyuki Izawa, Anjo (JP); Hideki Hisada, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 92 days.

(21) Appl. No.: 09/984,293

(22) Filed: Oct. 29, 2001

(65) Prior Publication Data

US 2002/0079148 A1 Jun. 27, 2002

(30) Foreign Application Priority Data

Dec. 27, 2000 (JP) ........................................ 2000-399059

(51) Int. Cl.[7] .............................................. B60K 1/00
(52) U.S. Cl. .................................................... 180/65.2
(58) Field of Search .............................. 180/65.2, 65.3, 180/65.4, 65.6; 701/22; 318/139; 475/5; 290/40 B, 40 C, 40 F; 60/705, 706; 477/2, 3, 4, 5

(56) References Cited

U.S. PATENT DOCUMENTS

| | | | | |
|---|---|---|---|---|
| 5,806,617 A | * | 9/1998 | Yamaguchi | ................ 180/65.2 |
| 5,823,281 A | * | 10/1998 | Yamaguchi et al. | ........ 180/65.2 |
| 6,233,508 B1 | * | 5/2001 | Deguchi et al. | ............... 701/22 |
| 6,348,771 B1 | * | 2/2002 | Morimoto et al. | ........... 318/139 |
| 6,440,036 B1 | * | 8/2002 | Minowa et al. | ................. 477/5 |
| 6,522,024 B1 | | 2/2003 | Takaoka et al. | |
| 2001/0049570 A1 | * | 12/2001 | Yamaguchi et al. | |
| 2002/0055411 A1 | * | 5/2002 | Yoshiaki et al. | |
| 2002/0079147 A1 | * | 6/2002 | Yamaguchi et al. | ........ 180/65.2 |
| 2002/0112901 A1 | * | 8/2002 | Yamaguchi et al. | ........ 180/65.2 |
| 2002/0071383 A1 | * | 11/2002 | Netsu et al. | |
| 2004/0055799 A1 | * | 3/2004 | Atarashi et al. | ........... 180/65.2 |

FOREIGN PATENT DOCUMENTS

| | | | |
|---|---|---|---|
| JP | 8-207601 | * | 8/1996 |
| JP | 10-238380 | * | 9/1998 |
| JP | 3023653 B2 | | 1/2000 |
| JP | 2001-1773 | * | 1/2001 |
| JP | 2002-159105 | * | 5/2002 |
| WO | WO 00/39444 | | 7/2000 |

* cited by examiner

Primary Examiner—Bryan Fischmann
(74) Attorney, Agent, or Firm—Oliff & Berridge, PLC (57) ABSTRACT

A hybrid vehicle including an engine, a generator motor, an output shaft connected to a drive wheel, a differential gear device including at least three gear elements that are connected to the engine, the generator motor and the output shaft, respectively; a fixing device that mechanically fixes a rotation of the generator motor; and a controller that calculates a correction value partially based on a generator motor torque and corrects an engine torque by the correction value.

23 Claims, 9 Drawing Sheets

HYBRID VEHICLE AND CONTROL METHOD THEREOF

BACKGROUND OF THE INVENTION

1. Field of Invention

The invention relates to a hybrid vehicle and a control method thereof.

2. Description of Related Art

A conventional hybrid vehicle in which a torque of the engine, that is, a portion of the torque is distributed to a generator motor and the remainder torque is distributed to a drive wheel, has a planetary gear unit that includes a sun gear, a ring gear and a carrier. The carrier is connected to the engine, the ring gear is connected to the drive wheel and the sun gear is connected to the generator motor. Rotation outputted from the ring gear and a drive motor is transferred to the drive wheel to produce a drive force.

In the hybrid vehicle constructed as described above, electric power is generated by the generator motor when the vehicle is running by driving the drive motor and the engine. If the rotation speed of the generator motor (the generator motor rotation speed) is low, the electric power consumption becomes great and the electric power generation efficiency correspondingly reduces. Therefore, a design is made as follows. That is, a brake as a fixing device is disposed between a rotor of the generator motor and a casing. If the generator motor rotation speed becomes equal to or less than 500 rpm, the brake is engaged to fix the rotation of the generator motor. After that, the generator motor rotation speed is calculated based on a rotation speed of an output shaft (an output rotation speed), of the planetary gear unit. The output rotation speed is calculated based on the vehicle speed and a revolution speed of the engine (an engine revolution speed) at an engine operation point where the power generation efficiency is high. If the generator motor rotation speed becomes greater than 500 rpm, the brake is released to remove the fixation of rotation to allow the rotor to rotate.

While the brake is in an engaged state, the torque of the engine, that is, the engine torque, acts on the rotor as a reaction force. Therefore, if the brake is merely released, the engine torque is transferred to the rotor so that the generator motor torque and the engine torque greatly change, thus causing a shock.

Therefore, the engine torque transferred to the rotor is estimated, and the brake is released after a generator motor torque corresponding to the estimated engine torque is produced in a direction opposite to the direction of the engine torque, to reduce the aforementioned occurrence of a shock. (Japanese Patent Application Laid-Open No. HEI 9-100853).

However, in the above-described conventional hybrid vehicle, a difference occurs between the estimated engine torque and the actual engine torque depending on the service condition of the engine, for example, the temperature of engine oil and the like, and furthermore, depending on individual variations of engines, for example, the inertia of the engine. Therefore, occurrence of a shock cannot be sufficiently suppressed.

SUMMARY OF THE INVENTION

In view of the foregoing, the invention thus provides a hybrid vehicle and a control method thereof capable of sufficiently suppressing the occurrence of a shock when the fixation of rotation by the fixing means is removed.

In various exemplary embodiments of a hybrid vehicle according to the invention, the hybrid vehicle includes: an engine; a generator motor; an output shaft connected to a drive wheel; a differential gear device including at least three gear elements that are connected to the engine, the generator motor and the output shaft, respectively; a fixing device for mechanically fixing rotation of the generator motor; and a controller that calculates a correction value partially based on a generator motor torque and corrects an estimated engine torque by the correction value.

In this case, the correction value is calculated partially based on the estimated engine torque and the estimated engine torque is corrected by the correction value. Therefore, it becomes possible to prevent an event where after the fixation of rotation by the fixing device is removed, the rotor of the generator motor receives an influence caused by the service condition of the engine, for example, the temperature of engine oil or the like, or an influence caused by individual variations of the engine, for example, the inertia of the engine.

Therefore, it is also possible to prevent the generator motor torque and the engine torque from changing to great extents. Hence, occurrence of a shock can be sufficiently suppressed.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

Preferred embodiments of the invention will be described hereinafter in detail with reference to the drawings.

Figure 1:
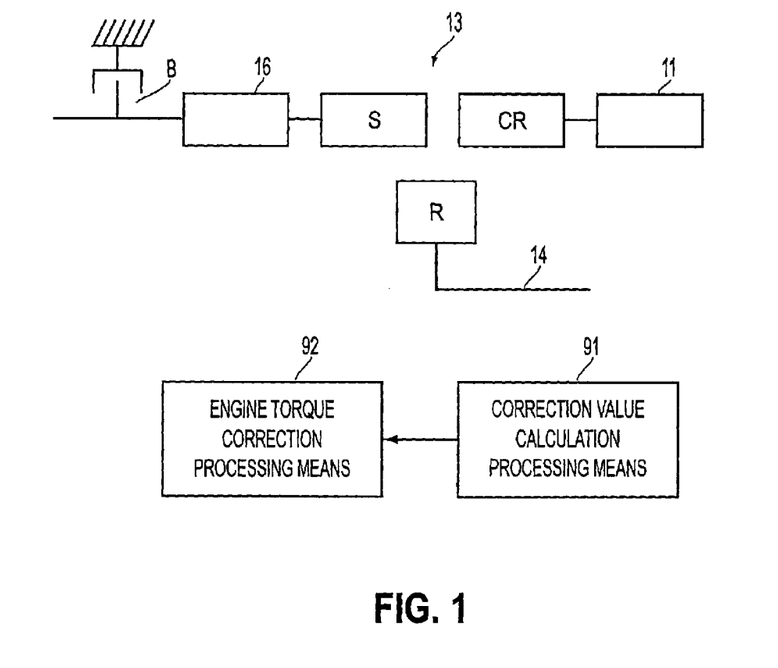
FIG. 1 is a function block diagram of a hybrid vehicle in accordance with a first embodiment of the invention.

FIG. 1 is a function block diagram of a hybrid vehicle in accordance with a first embodiment of the invention. In FIG. 1, reference numeral 11 represents an engine; 16 represents a generator motor; 13 represents a planetary gear unit as a differential gear device including an output shaft 14, a sun gear S, a ring gear R and a carrier CR wherein the sun gear S, the ring gear R and the carrier CR are connected to the engine 11, the generator motor 16 and the output shaft 14, respectively, B represents a brake as a fixing device for mechanically fixing rotation of the generator motor 16; 91 represents a correction value calculation processing means for calculating a correction value based on an estimated engine torque calculated through estimation and a generator motor torque; and 92 represents an engine torque correction processing means for correcting the estimated engine torque by the correction value.

Figure 2:
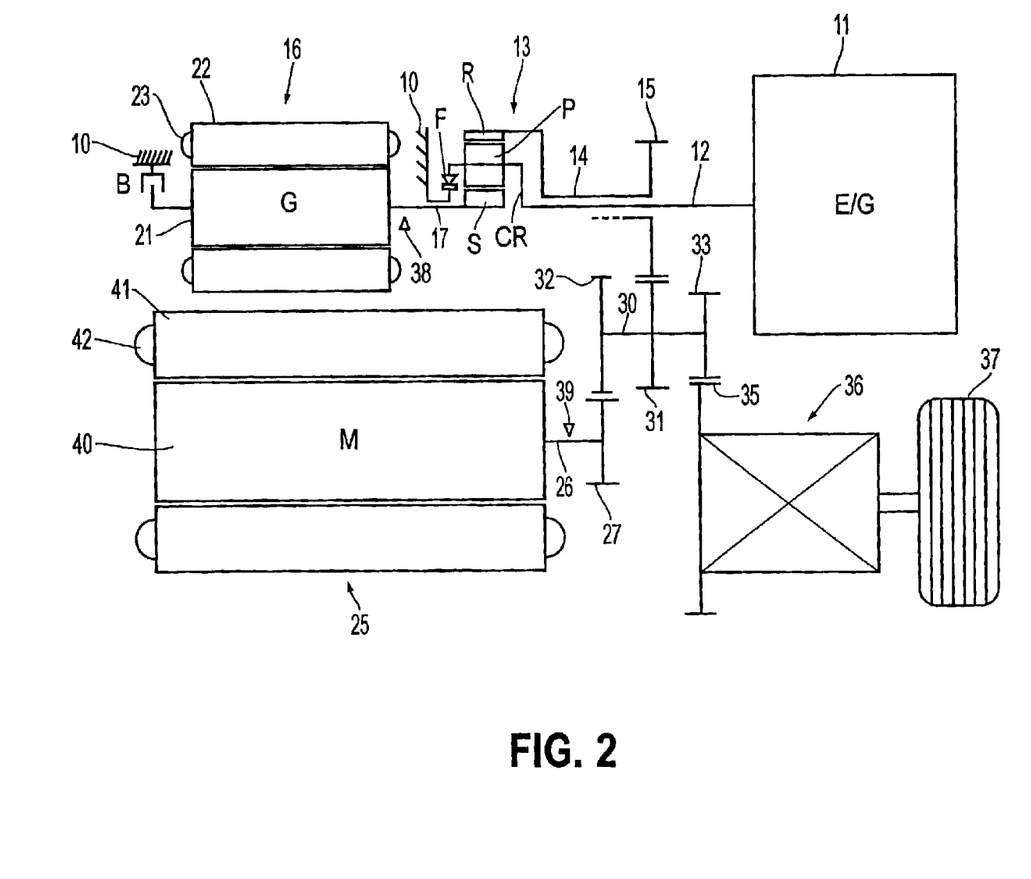
FIG. 2 is a conceptual diagram of a hybrid vehicle in accordance with the first embodiment of the invention.

FIG. 2 is a conceptual diagram of a hybrid vehicle in accordance with the first embodiment of the invention. In the drawing, reference numeral 11 represents the engine (E/G) disposed on a first axis; 12 represents an output shaft disposed on the first axis for outputting the rotation produced by driving the engine 11; 13 represents the planetary gear unit as a differential gear device disposed on the first axis for changing the speed of rotation inputted thereto via the output shaft 12; 14 represents the output shaft disposed on the first axis for outputting rotation after the speed of rotation has been changed by the planetary gear unit 13; 15 represents a first counter drive gear as an output gear fixed to the output shaft 14; and 16 represents the generator motor (G) as a first electric motor that is disposed on the first axis, and that is connected to the planetary gear unit 13 via a transfer shaft 17 disposed on the first axis as well, and is mechanically connected to the engine 11.

The output shaft 14 has a sleeve-like shape, and is disposed around the output shaft 12. The first counter drive gear 15 is disposed at an engine 11 side of the planetary gear unit 13.

The planetary gear unit 13 includes at least the sun gear S as a first gear element, pinions P meshed with the sun gear S, the ring gear R as a second gear element meshed with the pinions P, and the carrier CR as a third gear element that rotatably supports the pinions P. The sun gear S is connected to the generator motor 16 via the transfer shaft 17. The ring gear R is connected to a drive wheel 37 via the output shaft 14 and a certain gear train. The carrier CR is connected to the engine 11 via the output shaft 12. A one-way clutch F is disposed between the carrier CR and a casing 10 of a drive apparatus. The one-way clutch F becomes free when forward rotation is transferred from the engine 11 to the carrier CR. When reverse rotation is transferred to the carrier CR from the generator motor 16 or a drive motor (M) 25 that is disposed on a second axis parallel to the first axis and is mechanically interconnected with the generator motor 16, the one-way clutch F is locked to prevent reverse rotation from being transferred to the engine 11. The output shaft 14, the drive motor 25 and the drive wheel 37 are mechanically connected.

The generator motor 16 is made up of a rotor 21 fixed to the transfer shaft 17 to be freely rotatable, a stator 22 disposed around the rotor 21, and a coil 23 formed on the stator 22. The generator motor 16 generates electric power from rotation transferred thereto via the transfer shaft 17. The coil 23 is connected to a battery (not shown), and supplies DC current to the battery. The brake B as a fixing means is disposed between the rotor 21 and the casing 10. By engaging the brake B, the rotor 21 can be fixed to mechanically fix rotation of the generator motor 16. To that end, a hydraulic servo (not shown) of the brake B is connected to an oil pressure source by a changeover valve that is equipped with a solenoid. Therefore, the brake B can be engaged and disengaged by a below-described vehicle control unit 51 sending a solenoid signal to switch the changeover valve to supply oil pressure from the oil pressure source to the hydraulic servo or discharge oil pressure from the hydraulic servo.

Furthermore, reference numeral 26 represents an output shaft which is disposed on the second axis and to which rotation of the drive motor 25 is outputted; and 27 represents a second counter drive gear as an output gear fixed to the output shaft 26. The drive motor 25 is made up of a rotor 40 fixed to the output shaft 26 so that the rotor 40 is rotatable, a stator 41 disposed around the rotor 40, and a coil 42 formed on the stator 41.

The drive motor 25 produces drive motor torque from current supplied to the coil 42. To that end, the coil 42 is connected to the battery, and is supplied with AC current converted from DC current from the battery. The generator motor 16, the drive motor 25 and the drive wheel 37 are mechanically connected.

In order to turn the drive wheel 37 in the same rotating direction as the engine 11, a counter shaft 30 is disposed on a third axis parallel to the first and second axes. Fixed to the counter shaft 30 are a first counter driven gear 31 and a second counter driven gear 32 that has more teeth than the first counter driven gear 31. The first counter driven gear 31 and the first counter drive gear 15 are meshed. The second counter driven gear 32 and the second counter drive gear 27 are meshed. Thus, rotation of the first counter drive gear 15 is transferred to the first counter driven gear 31 while rotation is reversed. Rotation of the second counter drive gear 27 is transferred to the second counter driven gear 32 while rotation is reversed.

Also fixed to the counter shaft 30 is a differential pinion gear 33 that has fewer teeth than the first counter driven gear 31.

A differential apparatus 36 is disposed on a fourth axis parallel to the first to third axes. A differential ring gear 35 of the differential apparatus 36 is meshed with the differential pinion gear 33. Therefore, rotation transferred to the differential ring gear 35 is distributed by the differential apparatus 36, and is transferred to the drive wheel 37. In FIG. 2, reference numeral 38 represents a generator motor rotation speed sensor for detecting the rotation speed of the generator motor 16, that is, the generator motor rotation speed NG; and 39 represents a drive motor rotation speed sensor for detecting the rotation speed of the drive motor 25, that is, the drive motor rotation speed NM.

Thus, rotation produced by the engine 11 can be transferred to the first counter driven gear 31. Furthermore, rotation produced by the drive motor 25 can be transferred to the second counter driven gear 32. Therefore, by driving the engine 11 and the drive motor 25, the hybrid vehicle can be run.

Figure 3:
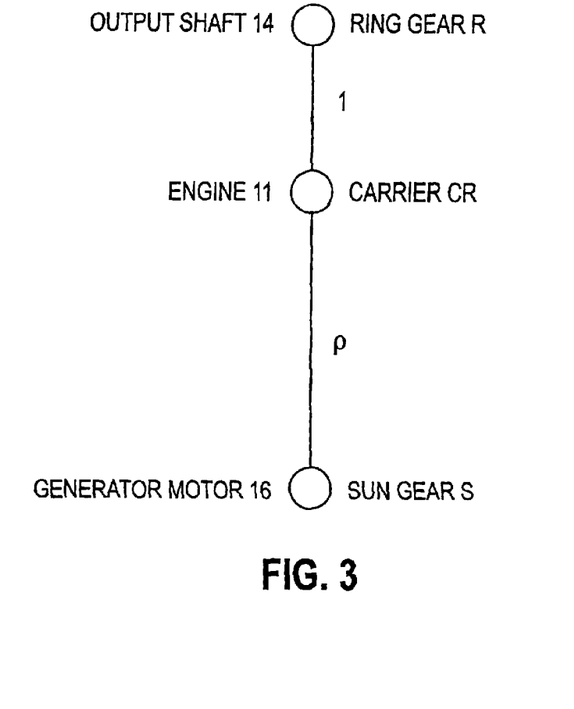
FIG. 3 is a diagram illustrating operation of a planetary gear unit in accordance with the first embodiment of the invention.

Next described will be an operation of the planetary gear unit 13.

Figure 4:
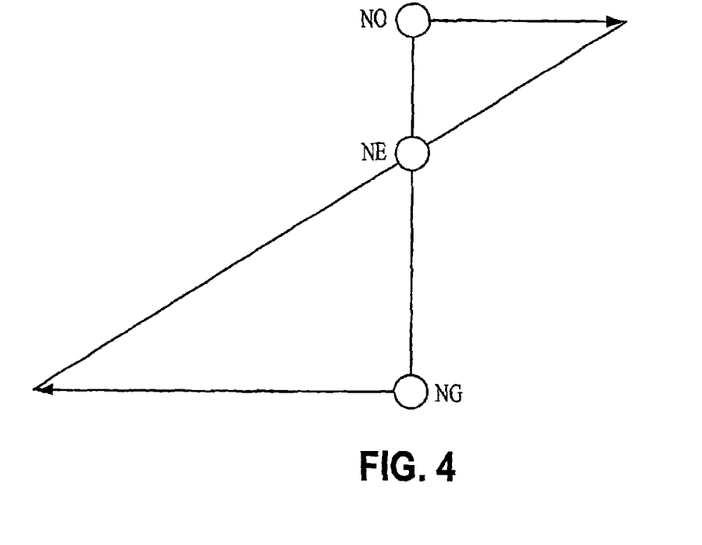
FIG. 4 is a vehicle speed diagram in accordance with the first embodiment of the invention.

FIG. 3 is a diagram illustrating an operation of the planetary gear unit in accordance with the first embodiment of the invention. FIG. 4 is a vehicle speed diagram in accordance with the first embodiment of the invention.

In the planetary gear unit 13 (FIG. 2), the carrier CR and the sun gear S are connected to the engine 11 and the generator motor 16, respectively, and the ring gear R is connected to the drive wheel 37 via the output shaft 14. Therefore, the rotation speed of the ring gear R equals the rotation speed of the output shaft 14, that is, the output rotation speed NO. Furthermore, the rotation speed of the carrier CR equals the revolution speed of the engine 11, that is, the engine revolution speed NE, and the rotation speed of the sun gear S equals the rotation speed of the generator motor 16, that is, the generator motor rotation speed NG. If the number of teeth of the ring gear R is p times the number of teeth of the sun gear S (in this embodiment, twice the number of teeth of the sun gear S), a relationship holds as follows:

$$(p+1) \times NE = 1 \times NE + p \times NO$$

Therefore, on the basis of the output rotation speed NO and the generator motor rotation speed NG, the engine revolution speed NE can be calculated as in:

$$NE = (1 \times NG + p \times NO)/(p+1) \quad (1)$$

The torque of the engine 11, that is, the engine torque TE, and the torque of the output shaft 14, that is, the output torque TO, and the torque of the generator motor 16, that is, the generator motor torque TG have the following relationship:

$$TE:TO:TG=(p+1):p:1$$

Thus, the engine torque TE, the output torque TO and the generator motor torque TG are affected by reaction forces from one another.

Next described will be a control apparatus of the hybrid vehicle constructed as described above.

Figure 5:
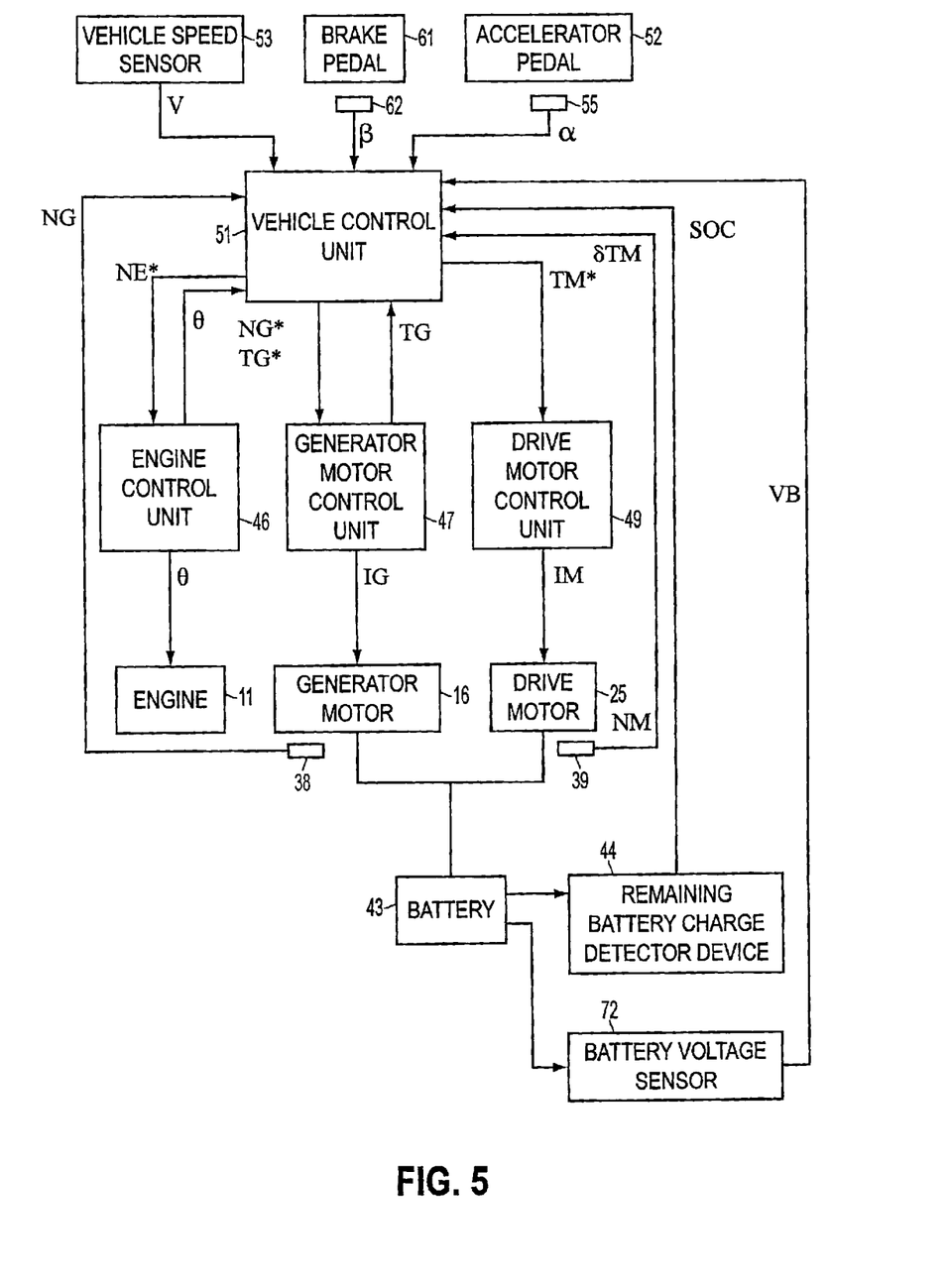
FIG. 5 is a block diagram illustrating a control unit of the hybrid vehicle in accordance with the first embodiment of the invention.

FIG. 5 is a block diagram illustrating a control unit of the hybrid vehicle in accordance with the first embodiment of the invention.

In FIG. 5, reference numeral 11 represents the engine; 16 represents the generator motor; 25 represents the drive motor; and 43 represents the battery. Reference numeral 46 represents an engine control unit as an engine control device for controlling the engine 11. The engine control unit 46 sends to the engine 11 an instruction signal such as a throttle opening 0 or the like. Reference numeral 47 represents the generator motor control unit as a generator motor control device for controlling the generator motor 16. The generator motor control unit 47 sends a current instruction value IG to the generator motor 16. Reference numeral 49 represents a drive motor control unit as a drive motor control device for controlling the drive motor 25. The drive motor control unit 49 sends a current instruction value IM to the drive motor 25.

Reference numeral 51 represents a vehicle control unit made up of a CPU, a recording device, etc. (which are not shown) for performing overall control of the hybrid vehicle; 44 represents a remaining battery charge detector device for detecting the remaining amount of battery charge SOC as a state of the battery 43; 52 represents an accelerator pedal; 53 represents a vehicle speed sensor for detecting the vehicle speed V; 55 represents an accelerator switch as an accelerator operation amount detecting device for detecting the amount of depression of the accelerator pedal 52, that is, the accelerator operation amount a; 61 represents a brake pedal; 62 represents a brake switch as a brake operation detecting device for detecting the amount of depression of the brake pedal 61; 38 represents a generator motor rotation speed sensor for detecting the generator motor rotation speed NG; 39 represents a drive motor rotation speed sensor for detecting the drive motor rotation speed NM; and 72 represents a battery voltage sensor for detecting the battery voltage VB as a state of the battery 43. The remaining battery charge detector device 44 and the battery voltage sensor 72 form a battery state detecting device.

The vehicle control unit 51 sets the driving and stopping of the engine 11 by sending control signals to the engine control unit 46, and reads the generator motor rotation speed NG and the drive motor rotation speed NM to calculate the engine revolution speed NE, and sets a target value of the engine revolution speed NE, that is, a target engine revolution speed NE*, in the engine control unit 46, and sets a target value of the generator motor rotation speed NG, that is, a target generator motor rotation speed NG*, and a target value of the generator motor torque TG, that is, a target generator motor torque TG*, in the generator motor control unit 47, and sets a target value of the generator motor torque TG, that is, a target generator motor torque TG*, and a drive motor torque correction value δTM in the drive motor control unit 49.

Although in this embodiment, the vehicle control unit 51 calculates the engine revolution speed NE, it is also possible to dispose an engine revolution speed sensor (not shown) and to detect the engine revolution speed NE through the use of the engine revolution speed sensor. Furthermore, although in the embodiment, the vehicle speed V is detected based on the output rotation speed NO, the vehicle speed V may also be detected based on the rotation speed of the ring gear R, the rotation speed of the drive wheel 37, etc.

Next described will be an operation of the hybrid vehicle constructed as described above.

Figure 6:
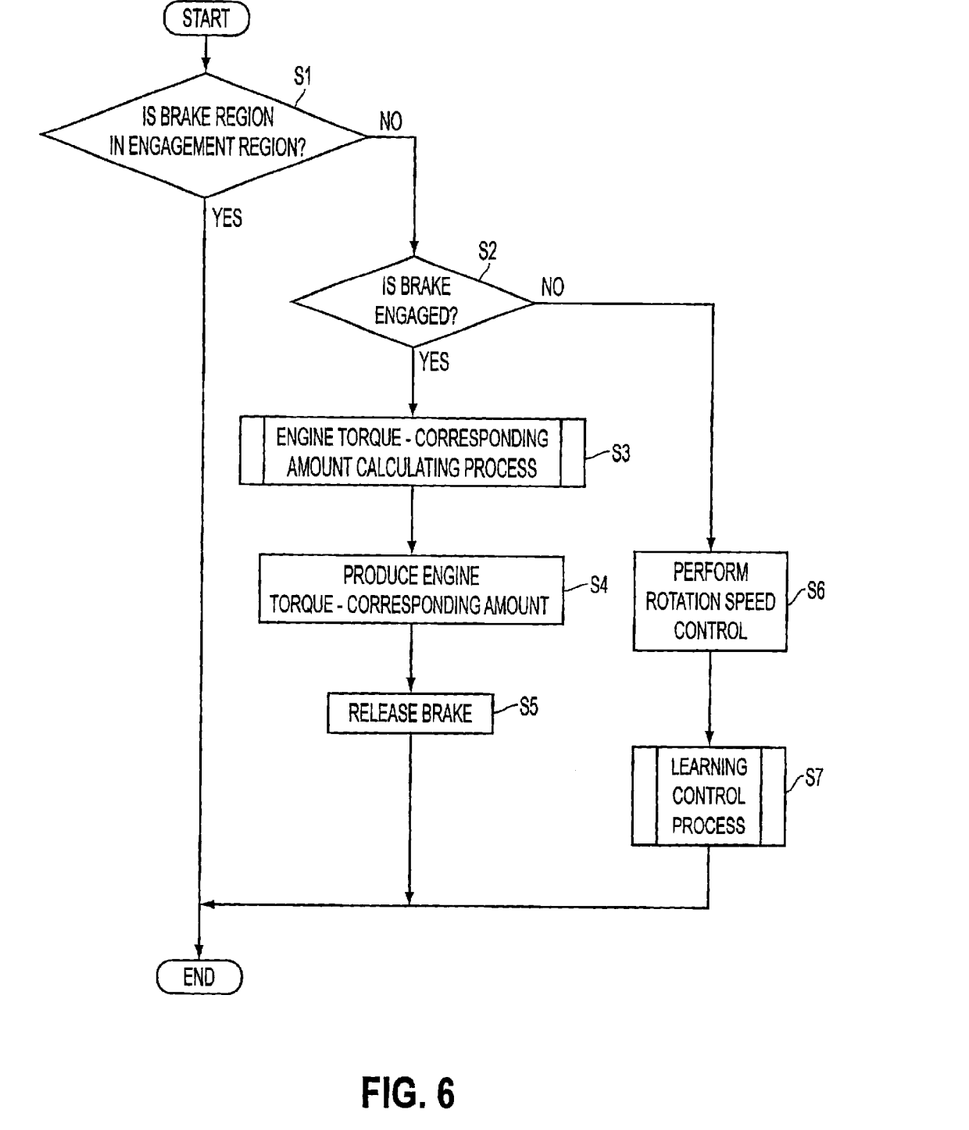
FIG. 6 is a main flowchart illustrating an operation of the hybrid vehicle in accordance with the first embodiment of the invention.
Figure 7:
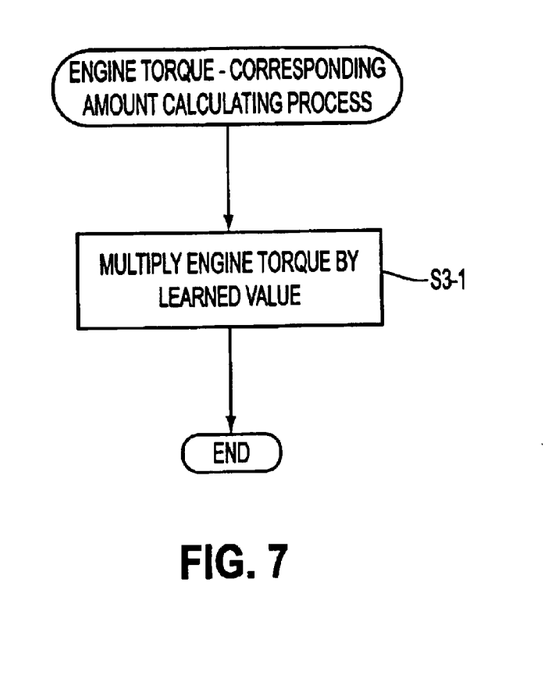
FIG. 7 is a chart illustrating a sub-routine of an engine torque-corresponding amount calculating process in accordance with the first embodiment of the invention.
Figure 8:
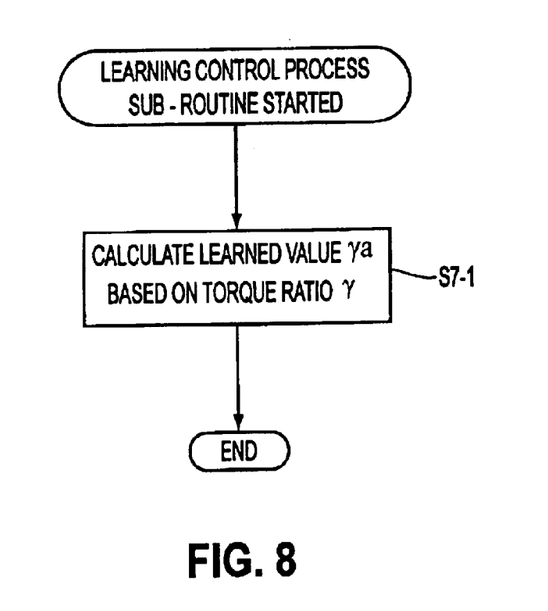
FIG. 8 is a chart illustrating a sub-routine of a learning control process in accordance with the first embodiment of the invention.
Figure 9:
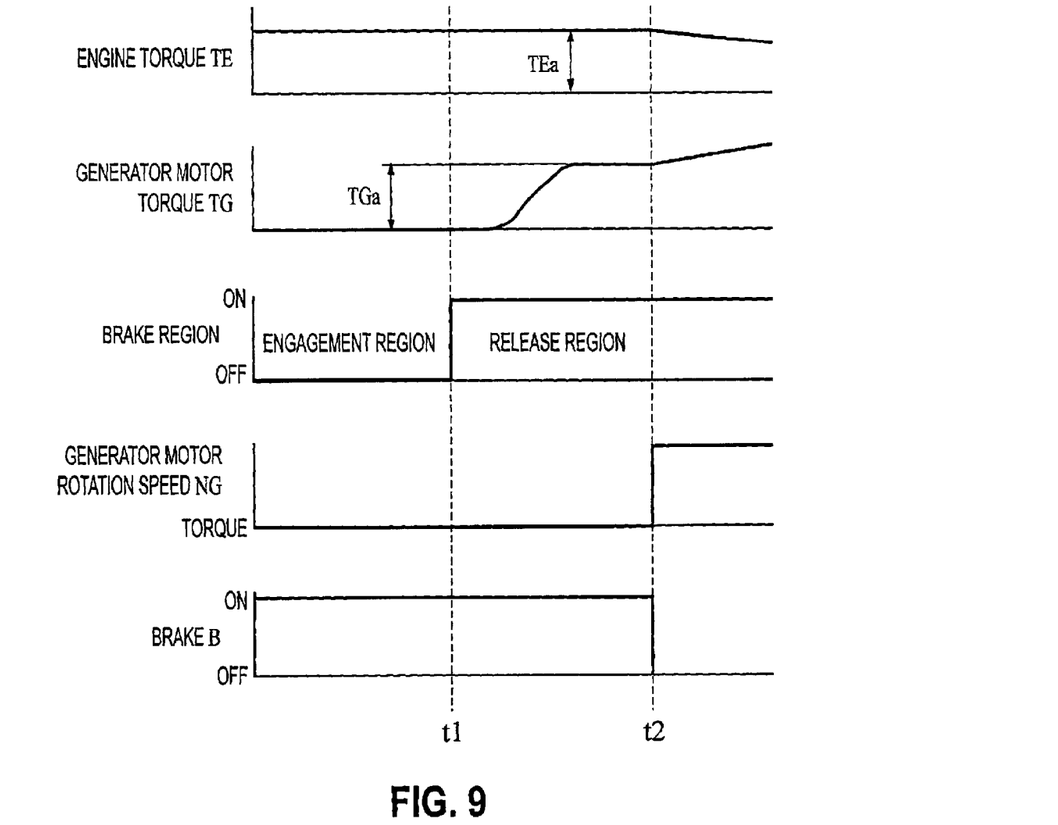
FIG. 9 is a time chart illustrating an operation of the hybrid vehicle in accordance with the first embodiment of the invention.

FIG. 6 is a main flowchart illustrating an operation of the hybrid vehicle in accordance with the first embodiment of the invention. FIG. 7 is a flowchart illustrating a sub-routine of an engine torque-corresponding amount calculating process in accordance with the first embodiment of the invention. FIG. 8 is a flowchart illustrating a sub-routine of a learning control process in accordance with the first embodiment of the invention. FIG. 9 is a time chart illustrating an operation of the hybrid vehicle in accordance with the first embodiment of the invention.

In the hybrid vehicle constructed as described above, power generation is performed by the generator motor 16 when the vehicle is run by driving the drive motor 25 (FIG. 2) and the engine 11. If the generator motor rotation speed NG is low, the power consumption becomes great and the power generation efficiency correspondingly reduces. Therefore, a design is made as follows. That is, if the generator motor rotation speed NG becomes equal to or less than 500 rpm and the brake region enters an engagement region (off), the rotor 21 is stopped by engaging (turning on) the brake B. After that, a generator motor rotation speed NG is calculated based on the output rotation speed NO calculated based on the vehicle speed V, and the engine revolution speed NE at an engine operation point where the power generation efficiency is high. If at a timing t1 the calculated generator motor rotation speed NG becomes greater than 500 rpm and the brake region enters a release region (on), the brake B is released to allow the rotor 21 to rotate.

While in the engagement region the brake B is engaged, the engine torque TE acts as a reaction force on the rotor 21. Therefore, if the brake B is merely released at the timing t1, the engine torque TE is transferred to the rotor 21 so that the generator motor torque TG and the engine torque TE greatly change, thus causing a shock.

Therefore, the vehicle control unit 51 performs an engine torque-corresponding amount calculating process. That is, the vehicle control unit 51 calculates the generator motor torque TG corresponding to an engine torque TEa that is actually transferred to the rotor 21 when the brake B is released, as an engine torque-corresponding amount TGa based on a learning control process.

Subsequently, the vehicle control unit 51 performs a target generator motor torque setting process. That is, the vehicle control unit 51 reads the engine torque-corresponding amount TGa, and sends the engine torque-corresponding amount TGa as a target generator motor torque TG* to the generator motor control unit 47, and sets the torque.

Then, the generator motor control unit 47 performs a torque control process. Upon receiving the target generator motor torque TG* from the vehicle control unit 51, the generator motor control unit 47 calculates a generator motor torque instruction value based on the target generator motor torque TG*. Subsequently, the generator motor control unit 47 generates a current instruction value IG such that a deviation ΔTG between the generator motor torque TG and the generator motor torque instruction value becomes equal to "0", and sends the current instruction value IG to the generator motor 16 to drive the generator motor 16. Thus, the generator motor 16 is caused to produce the generator motor torque TG equal to the engine torque-corresponding amount TGa. Torque control is thus performed. Subsequently, the vehicle control unit 51 performs a releasing process to release the brake B.

When the brake region is in the release region and the brake B is in a released state, the rotation speed control of the generator motor 16 is performed by the generator motor control unit 47. During that time, the vehicle control unit 51 performs a learning control process. Then, the vehicle control unit 51 calculates an engine torque-corresponding amount TGa based on a learned value γa calculated in the learning control process.

To that end, the vehicle control unit 51 performs an engine torque calculating process based on the state of operation of the engine 11. That is, the vehicle control unit 51 reads the vehicle speed V, and calculates an output rotation speed NO based on the gear ratio of a transfer line from the planetary gear unit 13 to the drive wheel 37, and calculates an engine revolution speed NE from the output rotation speed NO and the generator motor rotation speed NG as in the equation (1). Subsequently, the vehicle control unit 51 reads the degree of throttle opening θ from the engine control unit 46, and calculates an engine torque TE corresponding to the degree of throttle opening θ and the engine revolution speed NE by referring to an engine torque map (not shown).

The vehicle control unit 51 also performs a generator motor torque calculating process. By referring to a generator motor torque map (not shown), the vehicle control unit 51 calculates a generator motor torque TG corresponding to the generator motor rotation speed NG and the battery voltage VB.

Subsequently, the vehicle control unit 51 performs a learned value calculating process. That is, the vehicle control unit 51 reads the engine torque TE and the generator motor torque TG, and calculates the ratio of the generator motor torque TG to the engine torque TE, that is, the torque ratio γ. In this embodiment, the vehicle control unit 51 calculates the torque ratio γ in every predetermined control cycle, and determines a mean value of torque ratios γ calculated in a plurality of previous cycles as a learned value γa. The learned value γa forms a correction value for correcting the engine torque TE that has been calculated (i.e. estimated).

After the learned value γa is calculated based on the engine torque TE and the generator motor torque TG as described above, the vehicle control unit 51 corrects the engine torque TE by multiplying the calculated engine torque, that is, the engine torque TE, by the learned value γa, and thereby calculates the engine torque-corresponding amount TGa.

In this manner, the engine torque-corresponding amount TGa is calculated based on the engine torque TE and the learned value γa, and the engine torque-corresponding amount TGa is produced by driving the generator motor 16 when the brake B is to be released. Therefore, it becomes possible to prevent an event that after the brake B is released, the rotor 21 receives an influence caused by the service condition of the engine 11, for example, the temperature of engine oil or the like, or an influence caused by individual variations of the engine 11, for example, the inertia of the engine 11.

Therefore, it is possible to prevent the generator motor torque TG and the engine torque TE from changing to great extents. Hence, occurrence of a shock can be sufficiently suppressed.

The flowchart of FIG. 6 will be described. As shown in FIG. 6, the process proceeds to Step S1 where the generator motor control unit 47 determines whether the brake region is in the engagement region. If the brake region is in the engagement region, the process ends. If the brake region is not in the engagement region, the process proceeds to step S2. Then, in step S2, the generator motor control unit 47 determines whether the brake B is in the engaged state. If the brake B is in the engaged state, the process proceeds to step S3. If the brake B is not in the engaged state, the process proceeds to step S6.

In step S3, the engine torque-corresponding amount calculating process is performed. Then, in step S4, the engine torque-corresponding amount TGa is produced. The brake B is then released in step S5 and the process thereafter ends.

In step S6, the rotation speed control is performed. Then, in step S7, the learning control process is performed and the process thereafter ends.

Next will be described the flowchart of FIG. 7 where the engine torque-corresponding amount calculating process of step S3 of FIG. 6 occurs. In step S3-1, the engine torque TE is multiplied by the learned value γa and the process thereafter ends.

Next will be described the flowchart of FIG. 8 where the learning control process of step S7 of FIG. 6 occurs. In step S7-1, the learned value γa is calculated based on the torque ratio γ and the process thereafter ends.

In this embodiment, the learned value γa is calculated by calculating the torque ratio γ in the learning control process, and the engine torque-corresponding amount TGa is calculated by multiplying the engine torque TE by the learned value γa. However, it is also possible to calculate a learned value by calculating a difference between the engine torque TE and the generator motor torque TG in the learning control process and to calculate an engine torque-corresponding amount by adding the learned value γa to the engine torque TE.

A second embodiment of the invention will now be described.

Figure 10:
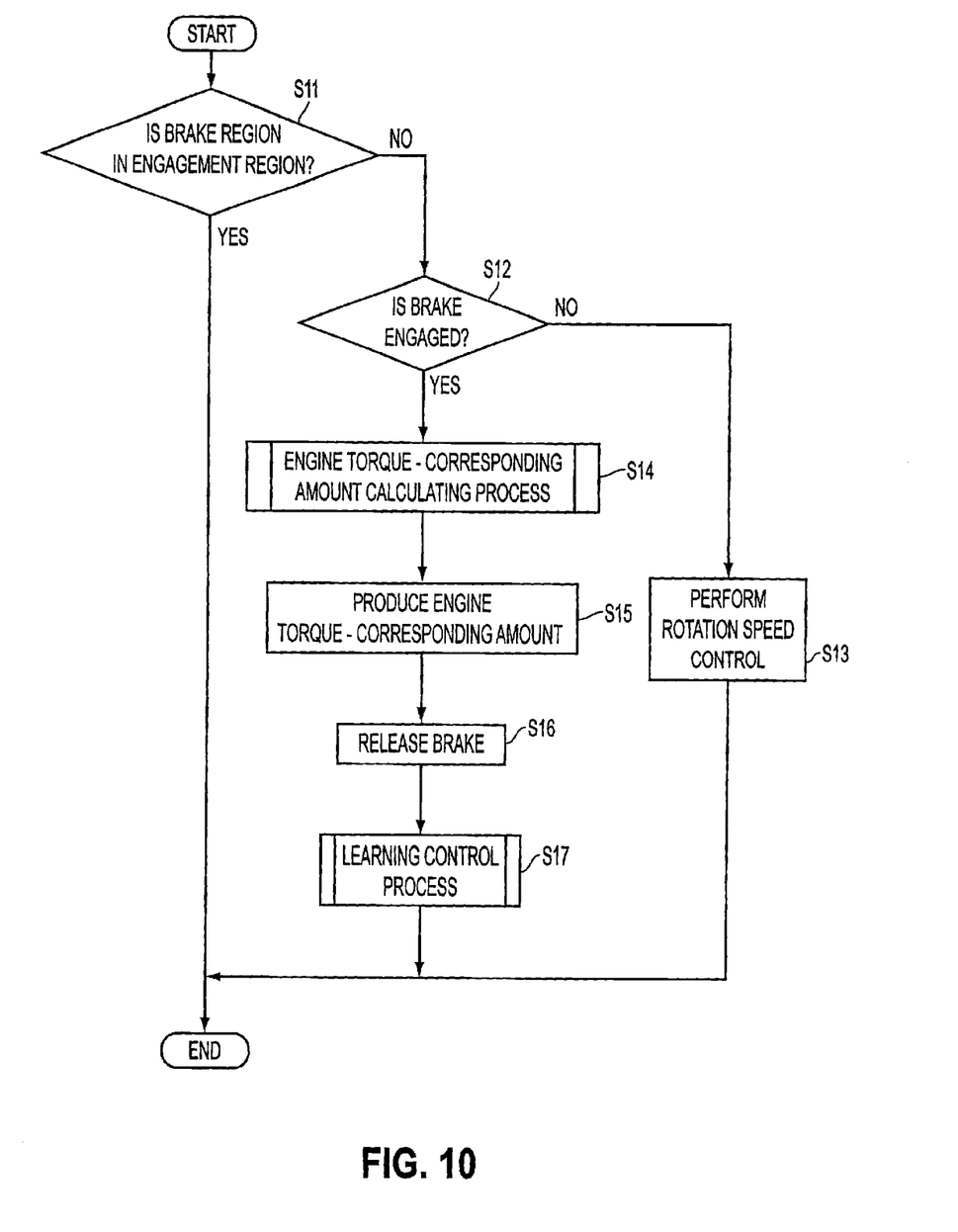
FIG. 10 is a main flowchart illustrating an operation of a hybrid vehicle in accordance with the second embodiment of the invention.
Figure 11:
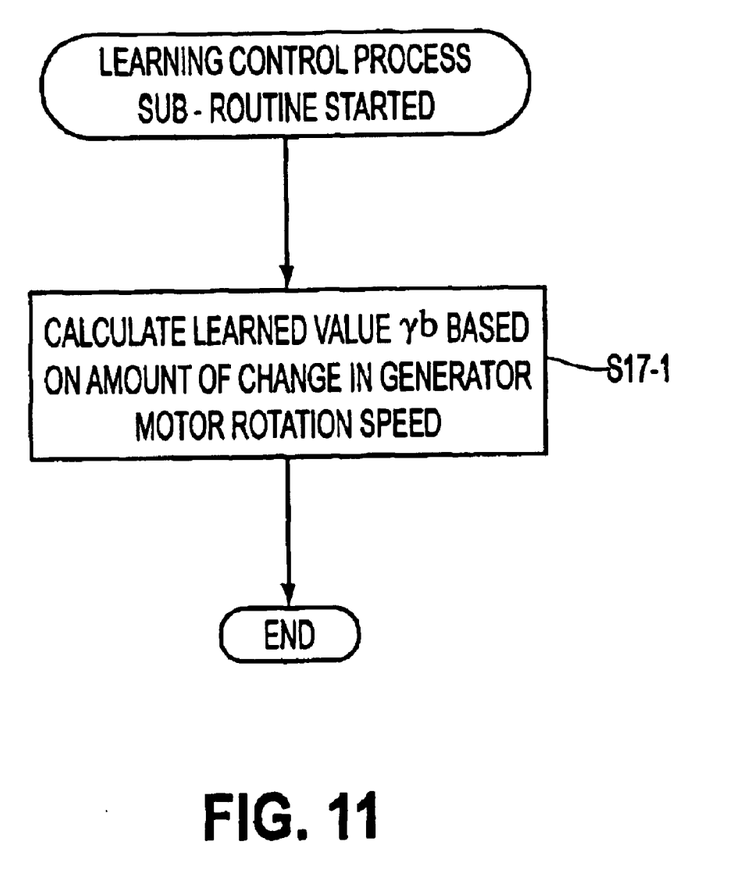
FIG. 11 is a diagram illustrating a sub-routine of a learning control process in accordance with the second embodiment of the invention.

FIG. 10 is a main flowchart illustrating an operation of a hybrid vehicle in accordance with the second embodiment of the invention. FIG. 11 is a diagram illustrating a sub-routine of a learning control process in accordance with the second embodiment of the invention.

In this embodiment, the rotation speed control of the generator motor 16 is performed by the generator motor control unit 47 (FIG. 5) as a generator motor control device when the brake region is in the release region and the brake B (FIG. 2) as a fixing device is in the released state. However, the learning control process is not performed for the rotation speed control.

When the brake region is in the release region and the brake B is engaged, the vehicle control unit 51 performs an engine torque-corresponding amount calculating process. That is, the vehicle control unit 51 calculates the generator motor torque TG corresponding to an engine torque TEa that is actually transferred to the rotor 21 when the brake B is released, as an engine torque-corresponding amount TGa based on a learning control process.

Subsequently, the vehicle control unit 51 performs a target generator motor torque setting process. That is, the vehicle control unit 51 reads the engine torque-corresponding amount TGa, and sends the engine torque-corresponding amount TGa as a target generator motor torque TG* to the generator motor control unit 47, and sets the torque.

Then, upon receiving the target generator motor torque TG* from the vehicle control unit 51, the generator motor control unit 47 calculates a generator motor torque instruction value based on the target generator motor torque TG*. Subsequently, a current instruction value generation processing means (not shown) of the generator motor control unit 47 generates a current instruction value IG such that a deviation ΔTG between the generator motor torque TG and the generator motor torque instruction value becomes equal to "0", and sends the current instruction value IG to the generator motor 16 to drive the generator motor 16. Thus, the generator motor 16 is caused to produce the generator motor torque TG equal to the engine torque-corresponding amount TGa. Torque control is thus performed. Subsequently, a release processing device as a removal processing device (not shown) of the vehicle control unit 51 performs a releasing process to release the brake B.

Then, when the brake B is released, the vehicle control unit 51 performs a learning control process. Then, the vehicle control unit 51 calculates an engine torque-corresponding amount TGa based on a learned value γb calculated in the learning control process.

To that end, the vehicle control unit 51 performs a learned value calculating process. The vehicle control unit 51 reads the generator motor rotation speed NG detected by the generator motor rotation speed sensor 38 when the brake B is released, and calculates an amount of change in the generator motor rotation speed NG occurring as the brake B is released, as an angular acceleration. By multiplying the angular acceleration by the inertia [kg×m²], the device calculates a difference between the engine torque TE and the generator motor torque TG as a torque difference ΔT.

Subsequently, the vehicle control unit 51 calculates the torque difference ΔT in every predetermined control cycle, and determines a mean value of the torque differences ΔT calculated in a plurality of previous cycles, as a learned value ΔTa. The learned value ΔTa forms a correction value for correcting an estimated engine torque TE.

After the learned value ΔTa is calculated as described above, the vehicle control unit 51 corrects the engine torque TE by adding the learned value ΔTa to the engine torque TE that has been calculated and estimated by the engine torque calculation processing device, and thereby calculates the engine torque-corresponding amount TGa.

In this manner, the engine torque-corresponding amount TGa is calculated based on the engine torque TE and the learned value ΔTa, and the engine torque-corresponding amount TGa is produced by driving the generator motor 16 when the brake B is to be released. Therefore, it becomes possible to prevent an event that after the brake B is released, the rotor 21 receives an influence caused by the service condition of the engine 11, for example, the temperature of engine oil or the like, or an influence caused by individual variations of the engine 11, for example, the inertia of the engine 11.

Therefore, it is possible to prevent the generator motor torque TG and the engine torque TE from changing to great extents. Hence, occurrence of a shock can be sufficiently suppressed.

Next will be described the flowchart of FIG. 10. As shown in FIG. 10, the process proceeds to step S11 where the generator motor control unit 47 determines whether the brake region is in the engagement region. If the brake region is in the engagement region, the process ends. If the brake region is not in the engagement region, the process proceeds to step S12.

In step S12, the generator motor control unit determines whether the brake B is in the engaged state. If the brake B is in the engaged state, the process proceeds to step S14. If the brake B is not in the engaged state, the process proceeds to step S13 where the rotation speed control is performed and the process thereafter ends.

In step S14, the engine torque-corresponding amount calculating process is performed followed by step S15, where the engine torque-corresponding amount TGa is produced. Then, in step S16, the brake B is released and in step S17, the learning control process is performed. The process thereafter ends.

Next will be described the flowchart of FIG. 11 where the learning control process of step S17 of FIG. 6 occurs. In step S17-1, the learned value ΔTa is calculated based on the amount of change ΔNG in the generator motor rotation speed NG and the process thereafter ends.

As should be appreciated, the invention is not limited to the above-described embodiments. Various modifications are possible based on the sprit of the invention, and are not excluded from the scope of the invention.

While the invention has been described with reference to what are presently considered to be preferred embodiments thereof, it is to be understood that the invention is non limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less or only a single embodiment, are also within the spirit and scope of the invention.

What is claimed is:

1. A hybrid vehicle, comprising:
   an engine;
   a generator motor;
   an output shaft connected to a drive wheel;
   a differential gear device including at least three gear elements that are connected to the engine, the generator motor and the output shaft, respectively; and
   a fixing device that mechanically fixes a rotation of the generator motor; and
   a controller that:
      calculates a correction value partially based on a generator motor torque; and
      corrects an estimated engine torque by the correction value, wherein the controller sets the generator motor torque to an initial torque to correspond to a corrected estimated engine torque at a release time of the fixing device.

2. The hybrid vehicle according to claim 1, wherein the controller calculates the correction value in a state where fixation of the rotation by the fixing device has been removed.

3. The hybrid vehicle according to claim 2, wherein controller calculates the correction value based on a ratio of the generator motor torque to the estimated engine torque.

4. The hybrid vehicle according to claim 1, wherein the controller:
   calculates an engine torque-corresponding amount corresponding to a corrected engine torque;
   performs a torque control by causing the generator motor to produce the engine torque-corresponding amount; and
   removes fixation of the rotation by the fixing device while the engine torque-corresponding amount is being produced.

5. The hybrid vehicle according to claim 1, wherein a drive motor is connected between the output shaft and the drive wheel.

6. The hybrid vehicle according to claim 1, wherein the controller calculates the generator motor torque based on an angular acceleration of the generator motor.

7. The hybrid vehicle according to claim 6, wherein the controller calculates the angular acceleration occurring when fixation of the rotation by the fixing device is removed.

8. The hybrid vehicle according claim 6, wherein the controller:
   calculates an engine torque-corresponding amount corresponding to a corrected estimated engine torque;
   performs a torque control by causing the generator motor to produce the engine torque-corresponding amount; and
   removes fixation of the rotation by the fixing device while the engine torque-corresponding amount is being produced.

9. The hybrid vehicle according to claim 6, wherein a drive motor is connected between the output shaft and the drive wheel.

10. A hybrid vehicle, comprising:
    an engine;
    a generator motor;
    an output shaft connected to a drive wheel;
    a differential gear device including at least three gear elements that are connected to the engine, the generator motor and the output shaft, respectively; and
    a controller that:
       calculates a correction value partially based on a generator motor torque; and
       corrects an estimated engine torque by the correction value, wherein the correction value is calculated by averaging a plurality of variation values.

11. A control method of a hybrid vehicle including an engine, a generator motor, and a fixing device that mechanically fixes a rotation of the generator motor, the control method comprising:
    calculating a correction value partially based on a generator motor torque; and
    correcting an estimated engine torque by the correction value, wherein the generator motor torque is set to an initial torque to correspond to a corrected estimated engine torque at a release time of the fixing device.

12. The method of claim 11, wherein the correction value is calculated in a state where fixation of the rotation by the fixing device has been removed.

13. The method of claim 12, wherein the correction value is calculated based on a ratio of the generator motor torque to the estimated engine torque.

14. The method of claim 11, wherein the estimated engine torque is calculated based on an operation state of the engine.

15. The method of claim 11, further comprising:

calculating an engine torque-corresponding amount corresponding to a corrected estimated engine torque;

performing a torque control by causing the generator motor to produce the engine torque-corresponding amount; and removing fixation of the rotation by the fixing device while the engine torque-corresponding amount is being produced.

16. The method of claim 11, wherein the generator motor torque is calculated based on an angular acceleration of the generator motor.

17. The method of claim 16, wherein the angular acceleration is calculated when fixation of the rotation by the fixing device is removed.

18. The method of claim 16, further comprising:

calculating an engine torque-corresponding amount corresponding to a corrected estimated engine torque;

performing a torque control by causing the generator motor to produce the engine torque-corresponding amount; and removing fixation of the rotation by a fixing device while the engine torque-corresponding amount is being produced.

19. The method of claim 11, wherein the hybrid vehicle includes an output shaft connected to a drive wheel and a differential gear device including at least three gear elements that are connected to the engine, the generator motor and the output shaft, respectively.

20. A control method of a hybrid vehicle including an engine, and a generator motor, the control method comprising:

calculating a correction value based on an estimated engine torque and a generator motor torque; and correcting the estimated engine torque by the correction value, wherein the correction value is calculated by averaging a plurality of variation values.

21. A hybrid vehicle, comprising:

an engine;

a generator motor;

an output shaft connected to a drive wheel;

a differential gear device including at least three gear elements that are connected to the engine, the generator motor and the output shaft, respectively; and a fixing device that mechanically fixes a rotation of the generator motor; and a controller that:

calculates a correction value partially based on a generator motor torque; and corrects an estimated engine torque by the correction value, wherein the controller calculates the correction value based on the estimated engine torque and the generator motor torque.

22. The hybrid vehicle according to claim 21, wherein the estimated engine torque is calculated based on an operation state of the engine.

23. A control method of a hybrid vehicle including an engine, a generator motor, a controller and a fixing device that mechanically fixes a rotation of the generator motor, the control method comprising:

calculating a correction value based on an estimated engine torque and a generator motor torque; and correcting the estimated engine torque by the correction value, wherein the controller calculates the value based on the estimated engine torque and the generator motor torque.

* * * * *